United States Patent
Santiago

(10) Patent No.: US 11,794,801 B1
(45) Date of Patent: Oct. 24, 2023

(54) HEATED STEERING WHEEL COVER ASSEMBLY

(71) Applicant: Alexander Santiago, Vail, CO (US)

(72) Inventor: Alexander Santiago, Vail, CO (US)

(*) Notice: Subject to any disclaimer, the term of this patent is extended or adjusted under 35 U.S.C. 154(b) by 0 days.

(21) Appl. No.: 18/086,842

(22) Filed: Dec. 22, 2022

(51) Int. Cl.
*B62D 1/06* (2006.01)

(52) U.S. Cl.
CPC .................... *B62D 1/065* (2013.01)

(58) Field of Classification Search
CPC ............ B62D 1/065; B62D 1/06; B62D 1/04
See application file for complete search history.

(56) References Cited

U.S. PATENT DOCUMENTS

| | | | | |
|---|---|---|---|---|
| 4,549,069 A * | 10/1985 | Oge | ........................ | B62D 1/065 219/535 |
| 5,294,775 A | 3/1994 | Carrier | | |
| 6,093,908 A * | 7/2000 | Haag | ........................ | B62D 1/065 219/204 |
| D429,671 S | 8/2000 | Stevens | | |
| 6,512,202 B2 | 1/2003 | Haag | | |
| 7,378,615 B1 * | 5/2008 | King | ........................ | B62D 1/065 219/204 |
| 8,101,887 B2 | 1/2012 | Pate | | |
| 10,793,063 B1 * | 10/2020 | Samuel, Jr. | ............ | B60Q 3/283 |
| 2004/0144197 A1 | 7/2004 | O Grady | | |
| 2010/0193495 A1 * | 8/2010 | Pate | ........................ | B60L 1/02 219/204 |
| 2015/0217687 A1 * | 8/2015 | Colvin, Sr. | ............ | G08B 21/06 180/272 |

FOREIGN PATENT DOCUMENTS

| | | | | |
|---|---|---|---|---|
| CA | 2468362 A1 * | 11/2005 | ............. | B62D 1/065 |
| CN | 107284511 A * | 10/2017 | | |
| CN | 111332357 A * | 6/2020 | | |
| WO | WO0164496 | 9/2001 | | |

* cited by examiner

*Primary Examiner* — Daniel D Yabut

(57) ABSTRACT

A heated steering wheel cover assembly for warming a steering wheel in a cold environment includes a steering wheel cover that is positionable over a steering wheel of a vehicle. A plurality of heating elements is each integrated into the steering wheel cover. Each of the heating elements is in thermal communication with the steering wheel cover for heating the steering wheel cover when the plurality of heating elements is turned on. In this way the plurality of heating elements enhance comfort for a user in a cold environment. Additionally, each of the heating elements is aligned with a respective quadrant of the steering wheel.

6 Claims, 4 Drawing Sheets

HEATED STEERING WHEEL COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to steering wheel device and more particularly pertains to a new steering wheel device for warming a steering wheel in a cold environment. The device includes a steering wheel cover and a plurality of heating elements integrated into the steering wheel cover. The device includes a plurality of batteries integrate into the steering wheel cover for powering the heating elements. The device includes a charge port in the steering wheel cover for charging the batteries and a power button for turning the heating elements on and off. The prior art discloses a heated steering wheel cover that includes a detachable battery pack.

(2) Description of Related Art Including Information Disclosed Under 37 CFR 1.97 and 1.98

The prior art relates to steering wheel devices including an steering wheel sleeve that is attachable around a steering wheel and a heating element in the steering wheel sleeve that is electrically coupled to switch on the steering wheel. The prior art discloses a variety of heated steering wheel covers that each requires a wired connection to an extrinsic power source. The prior art discloses a heated steering wheel cover that includes an annular member and a pair of supports each extending away from the annular member.

Brief Summary of the Invention

An embodiment of the disclosure meets the needs presented above by generally comprising a steering wheel cover that is positionable over a steering wheel of a vehicle. A plurality of heating elements is each integrated into the steering wheel cover. Each of the heating elements is in thermal communication with the steering wheel cover for heating the steering wheel cover when the plurality of heating elements is turned on. In this way the plurality of heating elements enhance comfort for a user in a cold environment. Additionally, each of the heating elements is aligned with a respective quadrant of the steering wheel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
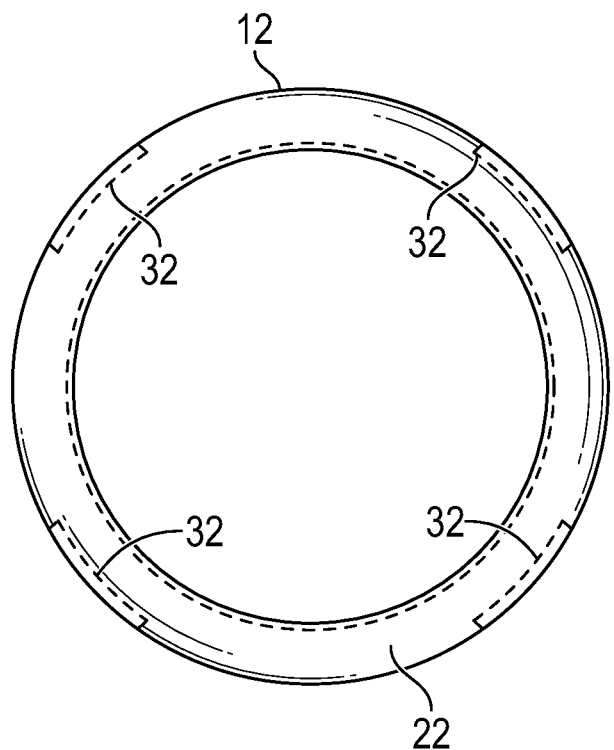
FIG. 1 is a front phantom view of a heated steering wheel cover assembly according to an embodiment of the disclosure.
Figure 2:
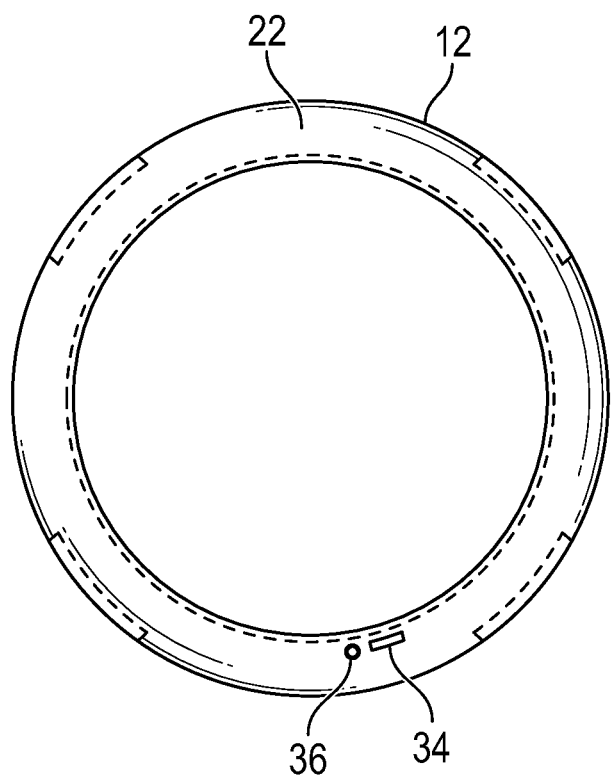
FIG. 2 is a back phantom view of an embodiment of the disclosure.
Figure 3:
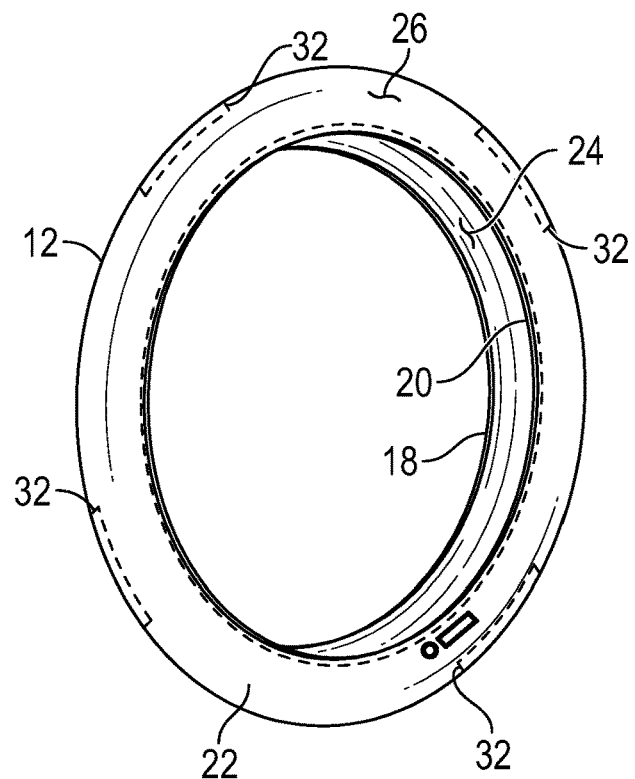
FIG. 3 is a perspective phantom view of an embodiment of the disclosure.
Figure 4:
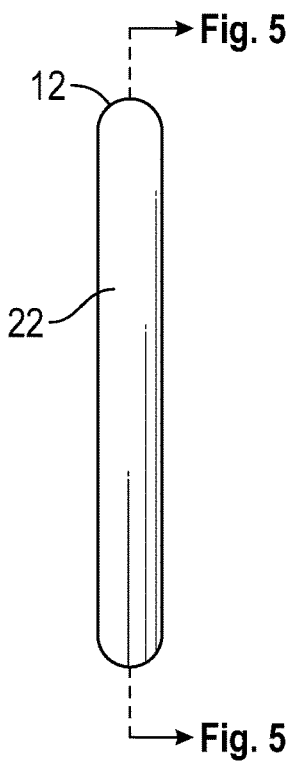
FIG. 4 is a right side view of an embodiment of the disclosure.
Figure 5:
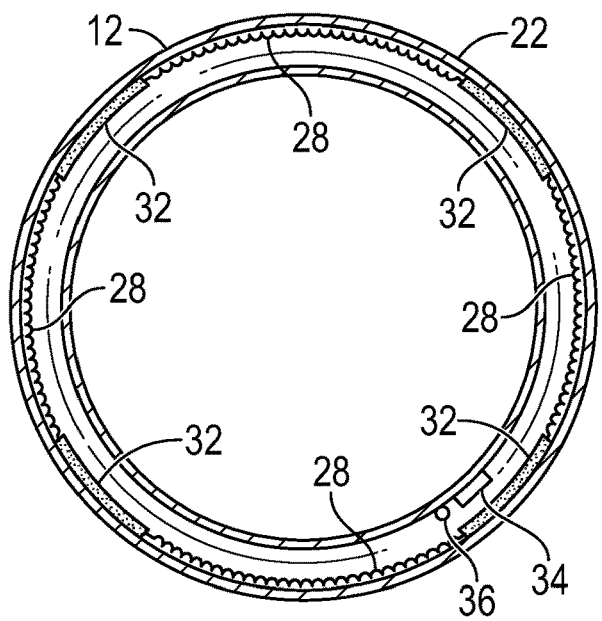
FIG. 5 is a cross sectional view taken along line 5-5 of FIG. 4 of an embodiment of the disclosure.
Figure 6:
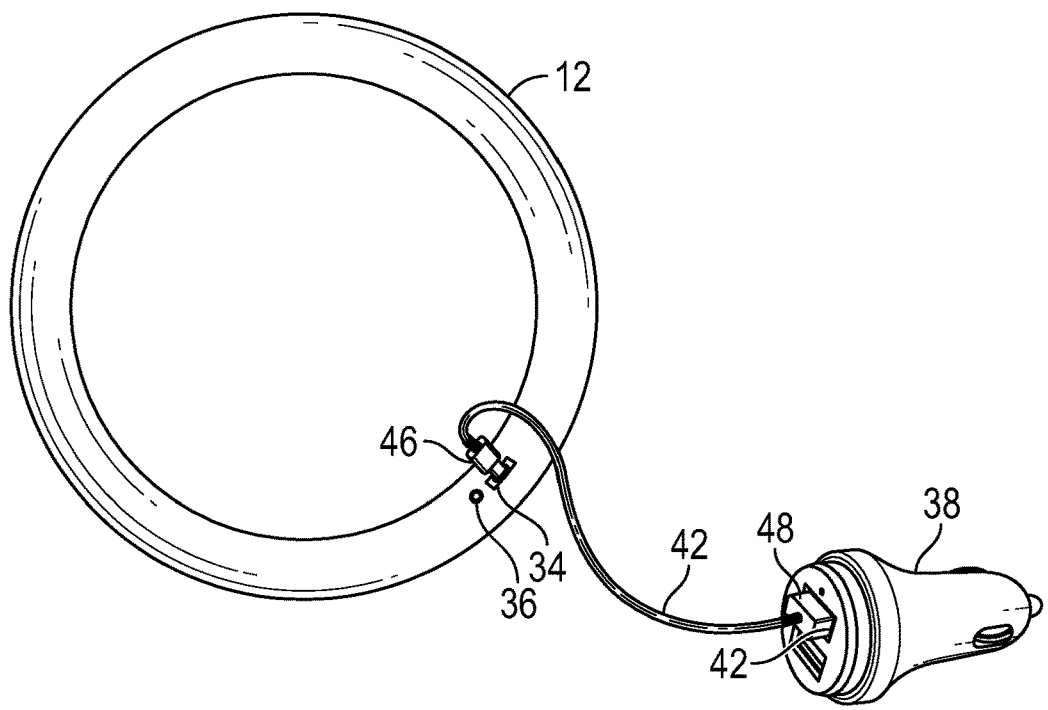
FIG. 6 is a back in-use view of an embodiment of the disclosure.
Figure 7:
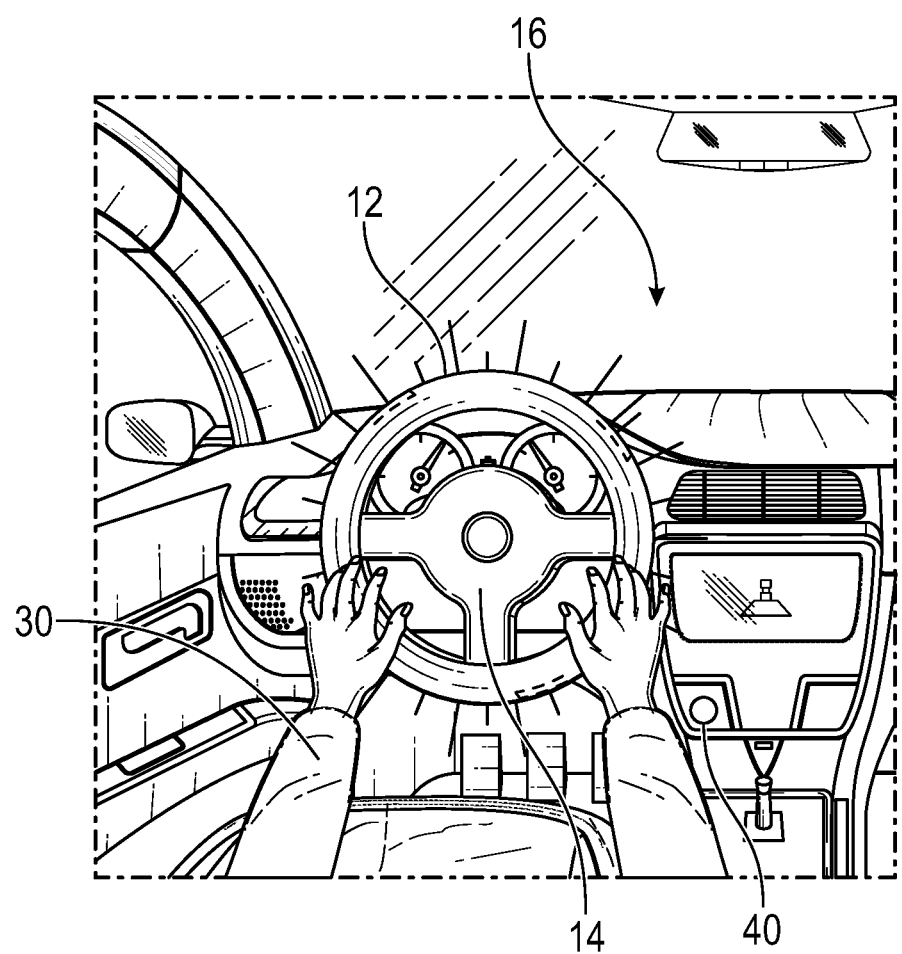
FIG. 7 is a perspective in-use view of an embodiment of the disclosure.

With reference now to the drawings, and in particular to FIGS. 1 through 7 thereof, a new steering wheel device embodying the principles and concepts of an embodiment of the disclosure and generally designated by the reference numeral 10 will be described.

As best illustrated in FIGS. 1 through 7, the heated steering wheel cover assembly 10 generally comprises a steering wheel cover 12 that is positionable over a steering wheel 14 of a vehicle 16. The vehicle 16 may be a passenger vehicle, a cargo vehicle, a recreational vehicle or any other type of motorized vehicle with a steering wheel 14 and which might be driven in winter conditions. The steering wheel cover 12 has a front edge 18, a back edge 20 and an outer wall 22 extending between the front edge 18 and the back edge 20. Furthermore, the outer wall 22 is annular such that the front edge 18 is spaced from the back edge 20. Each of the front edge 18 and the back edge 20 is continuously arcuate such that the steering wheel cover 12 forms a circular shape. The outer wall 22 has an inwardly facing surface 24 and an outwardly facing surface 26 and the outer wall 22 is comprised of a thermally conductive material, including but not being limited to, rubber or neoprene.

A plurality of heating elements 28 is provided and each of the plurality of heating elements 28 is integrated into the steering wheel cover 12. Each of the heating elements 28 is in thermal communication with the steering wheel cover 12 for heating the steering wheel cover 12 when the plurality of heating elements 28 is turned on. In this way the plurality of heating elements 28 enhance comfort for a user 30 in a cold environment. Each of the heating elements 28 is integrated into the outer wall 22 of the steering wheel 14 and each of the heating elements 28 is aligned with a respective quadrant of the steering wheel 14. Additionally, each of the heating elements 28 may comprise an electric heating coil that has an operational temperature ranging between approximately 80.0 degrees Fahrenheit and 100.0 degrees Fahrenheit.

A plurality of batteries 32 is provided and each of the plurality of batteries 32 is integrated into the steering wheel cover 12. Each of the plurality of batteries 32 is curved into a parabolic shape thereby facilitating each of the plurality of batteries 32 to conform to the curvature of the outer wall 22 of the steering wheel cover 12. Furthermore, each of the plurality of batteries 32 is positioned between a respective pair of the heating elements 28. Each of the plurality of batteries 32 is electrically coupled to the respective pair of heating elements 28 such that the plurality of heating elements 28 and the plurality of batteries 32 complete an electrical circuit.

A charge port 34 is recessed into the outwardly facing surface 26 of the outer wall 22 of the steering wheel cover 12 and the charge port 34 is electrically coupled to each of the plurality of batteries 32. The charge port 34 may comprise a universal serial bus port or other conventional type of female charging port. A power button 36 is movably integrated into the outwardly facing surface 26 of the outer wall 22 of the steering wheel cover 12. The power button 36 is electrically coupled to the plurality of heating elements 28 for turning the plurality of heating elements 28 on and off.

A charger 38 is provided that is insertable into a charge port 40 in the vehicle 16 and the charger 38 has an output port 42. The charger 38 may comprise a cigarette lighter adapter and the output port 42 in the charger 38 may comprise a universal serial bus port or other conventional type of female charging port. A charge cord 44 is includes which has a first plug 46 and a second plug 48. The first plug 46 is pluggable into the charge port 34 and the second plug 48 is pluggable into the output port 42 in the charger 38 for charging the plurality of batteries 32. Each of the first plug 46 and the second plug 48 may comprise a universal serial bus plug or other conventional type of male charging plug.

In use, the steering wheel cover 12 is positioned over the steering wheel 14 and the power button 36 is manipulated to turn on the heating elements 28. In this way the heating elements 28 heat the steering wheel cover 12 to enhance comfort for the user 30 when the steering wheel 14 is cold. Thus, the user 30 can enjoy the feeling of a warm steering wheel 14 until the heating system of the vehicle can adequately warm the interior of the vehicle. The charger 38 is plugged into the charge port 34 and the charge cord 44 is connected between the output port 42 in the charger 38 and the charge port 34 in the steering wheel cover 12. In this way the plurality of batteries 32 can be recharged thereby facilitating the steering wheel cover 12 to be employed without being connected to a charging wire.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heated steering wheel cover assembly for warming a steering wheel in a vehicle, said assembly comprising:
   a steering wheel cover being positionable over a steering wheel of a vehicle;
   a plurality of heating elements, each of said plurality of heating elements being integrated into said steering wheel cover, each of said heating elements being in thermal communication with said steering wheel cover for heating said steering wheel cover when said plurality of heating elements is turned on wherein said plurality of heating elements is configured to enhance comfort for a user in a cold environment, each of said heating elements being aligned with a respective quadrant of said steering wheel;
   wherein said steering wheel cover has a front edge, a back edge and an outer wall extending between said front edge and said back edge, said outer wall being curved between said front edge and said back edge such that said front edge is spaced from said back edge, each of said front edge and said back edge being continuously arcuate such that said steering wheel cover forms a circular shape, said outer having an inwardly facing surface and an outwardly facing surface;
   wherein each of said heating elements is integrated into said outer wall of said steering wheel; and
   a plurality of batteries, each of said plurality of batteries being integrated into said steering wheel cover, each of said plurality of batteries being curved into a parabolic shape thereby facilitating each of said plurality of batteries to conform to the curvature of said outer wall of said steering wheel cover, each of said plurality of batteries being positioned between a respective pair of said heating elements, each of said plurality of batteries being electrically coupled to said respective pair of heating elements such that said plurality of heating elements and said plurality of batteries completes an electrical circuit.

2. The assembly according to claim 1, further comprising a charge port being recessed into said outer wall of said steering wheel cover, said charge port being electrically coupled to each of said plurality of batteries.

3. The assembly according to claim 2, further comprising a charger being insertable into a charge port in the vehicle, said charger having an output port; and
   a charge cord having a first plug and a second plug, said first being pluggable into said charge port, said second plug being pluggable into said output port in said charger for charging said plurality of batteries.

4. The assembly according to claim 1, further comprising a power button being movably integrated into said outer wall of said steering wheel cover, said power button being electrically coupled to said plurality of heating elements for turning said plurality of heating elements on and off.

5. A heated steering wheel cover assembly for warming a steering wheel in a vehicle, said assembly comprising:
- a steering wheel cover being positionable over a steering wheel of a vehicle, said steering wheel cover having a front edge, a back edge and an outer wall extending between said front edge and said back edge, said outer wall being curved between said front edge and said back edge such that said front edge is spaced from said back edge, each of said front edge and said back edge being continuously arcuate such that said steering wheel cover forms a circular shape, said outer having an inwardly facing surface and an outwardly facing surface;
- a plurality of heating elements, each of said plurality of heating elements being integrated into said steering wheel cover, each of said heating elements being in thermal communication with said steering wheel cover for heating said steering wheel cover when said plurality of heating elements is turned on wherein said plurality of heating elements is configured to enhance comfort for a user in a cold environment, each of said heating elements being integrated into said outer wall of said steering wheel, each of said heating elements being aligned with a respective quadrant of said steering wheel;
- a plurality of batteries, each of said plurality of batteries being integrated into said steering wheel cover, each of said plurality of batteries being curved into a parabolic shape thereby facilitating each of said plurality of batteries to conform to the curvature of said outer wall of said steering wheel cover, each of said plurality of batteries being positioned between a respective pair of said heating elements, each of said plurality of batteries being electrically coupled to said respective pair of heating elements such that said plurality of heating elements and said plurality of batteries completes an electrical circuit;
- a charge port being recessed into said outer wall of said steering wheel cover, said charge port being electrically coupled to each of said plurality of batteries;
- a power button being movably integrated into said outer wall of said steering wheel cover, said power button being electrically coupled to said plurality of heating elements for turning said plurality of heating elements on and off;
- a charger being insertable into a charge port in the vehicle, said charger having an output port; and
- a charge cord having a first plug and a second plug, said first being pluggable into said charge port, said second plug being pluggable into said output port in said charger for charging said plurality of batteries.

6. A heated steering wheel cover system for warming a steering Wheel in a vehicle, said assembly comprising:
- a steering wheel positioned in a vehicle for steering said vehicle;
- a steering wheel cover being positionable over said steering wheel, said steering wheel cover having a front edge, a back edge and an outer wall extending between said front edge and said back edge, said outer wall being curved between said front edge and said back edge such that said front edge is spaced from said back edge, each of said front edge and said back edge being continuously arcuate such that said steering wheel cover forms a circular shape, said outer having an inwardly facing surface and an outwardly facing surface;
- a plurality of heating elements, each of said plurality of heating elements being integrated into said steering wheel cover, each of said heating elements being in thermal communication with said steering wheel cover for heating said steering wheel cover when said plurality of heating elements is turned on wherein said plurality of heating elements is configured to enhance comfort for a user in a cold environment, each of said heating elements being integrated into said outer wall of said steering wheel, each of said heating elements being aligned with a respective quadrant of said steering wheel;
- a plurality of batteries, each of said plurality of batteries being integrated into said steering wheel cover, each of said plurality of batteries being curved into a parabolic shape thereby facilitating each of said plurality of batteries to conform to the curvature of said outer wall of said steering wheel cover, each of said plurality of batteries being positioned between a respective pair of said heating elements, each of said plurality of batteries being electrically coupled to said respective pair of heating elements such that said plurality of heating elements and said plurality of batteries completes an electrical circuit;
- a charge port being recessed into said outer wall of said steering wheel cover, said charge port being electrically coupled to each of said plurality of batteries;
- a power button being movably integrated into said outer wall of said steering wheel cover, said power button being electrically coupled to said plurality of heating elements for turning said plurality of heating elements on and off;
- a charger being insertable into a charge port in the vehicle, said charger having an output port; and
- a charge cord having a first plug and a second plug, said first being pluggable into said charge port, said second plug being pluggable into said output port in said charger for charging said plurality of batteries.

* * * * *